(12) United States Patent
Harris

(10) Patent No.: US 10,793,222 B1
(45) Date of Patent: Oct. 6, 2020

(54) BICYCLE DERAILLEUR HAVING UPPER AND LOWER ALIGNMENT ASSEMBLIES

(71) Applicant: Jonathan K. Harris, Tulsa, OK (US)

(72) Inventor: Jonathan K. Harris, Tulsa, OK (US)

(*) Notice: Subject to any disclaimer, the term of this patent is extended or adjusted under 35 U.S.C. 154(b) by 284 days.

(21) Appl. No.: 15/464,486

(22) Filed: Mar. 21, 2017

(51) Int. Cl.
*B62M 9/122* (2010.01)
*B62M 9/1242* (2010.01)

(52) U.S. Cl.
CPC .......... *B62M 9/122* (2013.01); *B62M 9/1242* (2013.01)

(58) Field of Classification Search
CPC ...... B62M 9/122; B62M 9/123; B62M 9/124; B62M 9/1242; B62M 9/132; B62M 9/133; B62M 9/134; B62M 9/1342; B62M 9/00; B62M 9/04; B62M 9/06; B62M 9/10; B62M 9/12; B62M 9/121; B62M 9/131
See application file for complete search history.

(56) References Cited

U.S. PATENT DOCUMENTS

| | | | |
|---|---|---|---|
| 3,583,249 A | 6/1971 | Morse | |
| 4,201,095 A | 5/1980 | Cirami | |
| 4,412,828 A | 11/1983 | Darby | |
| 4,900,291 A | 2/1990 | Patterson | |
| 4,938,733 A | 7/1990 | Patterson | |
| 5,350,339 A | 9/1994 | Carmichael | |
| 5,466,194 A | 11/1995 | Steinberg et al. | |
| 5,518,456 A * | 5/1996 | Kojima | B62M 9/1242 474/77 |
| 5,533,937 A | 7/1996 | Patterson et al. | |
| 5,620,383 A | 4/1997 | Patterson et al. | |
| 5,624,335 A * | 4/1997 | Ando | B62M 9/1242 474/80 |
| 5,803,848 A | 9/1998 | Nier | |
| 5,836,844 A | 11/1998 | Yoshida | |
| 6,352,131 B1 | 3/2002 | Lin et al. | |
| 6,354,980 B1 | 3/2002 | Grant | |
| 6,394,921 B1 | 5/2002 | Fukuda | |
| 6,648,686 B2 | 11/2003 | Nishimoto | |
| 6,714,849 B1 | 3/2004 | Ferrero | |
| 6,767,308 B2 | 7/2004 | Kitamura | |
| 6,902,504 B2 | 6/2005 | Fukuda | |

(Continued)

FOREIGN PATENT DOCUMENTS

| | | |
|---|---|---|
| CN | 104097739 | 10/2014 |
| CN | 104260821 | 1/2015 |

(Continued)

*Primary Examiner* — Michael R Mansen
*Assistant Examiner* — Juan J Campos, Jr.
(74) *Attorney, Agent, or Firm* — Crowe & Dunlevy

(57) ABSTRACT

A rear derailleur is provided for a bicycle. The rear derailleur has an upper alignment assembly and a lower alignment assembly pivotally connected via a linkage assembly. The upper alignment assembly is pivotally attached to the bicycle along a b-knuckle mounting axis, and the upper alignment assembly includes a motor assembly to pivot the upper alignment assembly along an upper rotatable axis that is generally perpendicular to the b-knuckle mounting axis. The lower alignment assembly is pivotally attached to a pulley assembly along a p-knuckle mounting axis, and the lower alignment assembly includes a motor assembly to pivot the lower alignment assembly along a lower rotatable axis that is generally perpendicular to the p-knuckle mounting axis.

25 Claims, 9 Drawing Sheets

(56) References Cited

U.S. PATENT DOCUMENTS

| | | |
|---|---|---|
| 6,979,009 B2 | 12/2005 | Ichida et al. |
| 7,013,751 B2 | 3/2006 | Hilsky et al. |
| 7,152,498 B2 | 12/2006 | Shahana et al. |
| 7,306,531 B2 | 12/2007 | Ichida et al. |
| 7,341,532 B2 | 3/2008 | Ichida et al. |
| 7,442,136 B2 | 10/2008 | Ichida et al. |
| 7,585,237 B2 | 9/2009 | Fukuda |
| 7,614,972 B2 | 11/2009 | Oseto |
| 7,805,268 B2 | 9/2010 | Takamoto |
| 7,824,285 B2 * | 11/2010 | Tan .................. B62M 9/127 474/80 |
| 8,025,597 B2 | 9/2011 | Takamoto |
| 8,181,553 B2 | 5/2012 | Tsumiyama |
| 8,882,122 B2 | 11/2014 | Emura et al. |
| 9,005,059 B2 * | 4/2015 | Suyama .................. B62M 9/122 474/80 |
| 9,008,923 B2 | 4/2015 | Takamoto et al. |
| 9,150,281 B2 | 10/2015 | Yamaguchi et al. |
| 9,216,793 B2 | 12/2015 | Vergara et al. |
| 2003/0092519 A1 | 5/2003 | Fukuda |
| 2005/0192138 A1 | 9/2005 | Sze et al. |
| 2005/0215368 A1 | 9/2005 | Hoe |
| 2006/0172840 A1 | 8/2006 | Kamada |
| 2006/0189422 A1 | 8/2006 | Ichida et al. |
| 2007/0173360 A1 * | 7/2007 | Shahana .............. B62M 9/1242 474/82 |
| 2007/0207885 A1 | 9/2007 | Watarai |
| 2008/0026890 A1 * | 1/2008 | Oseto .................. B62M 9/1242 474/82 |
| 2008/0026891 A1 * | 1/2008 | Oseto .................. B62M 9/1242 474/82 |
| 2008/0188336 A1 | 8/2008 | Tokuyama |
| 2009/0275429 A1 | 11/2009 | Deguchi et al. |
| 2010/0186538 A1 | 7/2010 | Tetsuka |
| 2012/0088618 A1 | 4/2012 | Scolari et al. |
| 2013/0252772 A1 | 9/2013 | Scolari et al. |
| 2013/0281237 A1 * | 10/2013 | Lin .................... B62M 9/124 474/80 |
| 2014/0070930 A1 | 3/2014 | Hara |
| 2014/0121047 A1 | 5/2014 | Katsura et al. |
| 2014/0148287 A1 * | 5/2014 | Tachibana ................ B62M 3/00 474/82 |
| 2014/0155206 A1 | 6/2014 | Johnson et al. |
| 2014/0162817 A1 * | 6/2014 | Yamaguchi ............ B62M 9/122 474/80 |
| 2014/0162818 A1 * | 6/2014 | Yamaguchi ............ F16H 61/68 474/80 |
| 2014/0213397 A1 * | 7/2014 | Yamaguchi ............ B62M 9/122 474/80 |
| 2014/0296009 A1 * | 10/2014 | Suyama ................ B62M 9/122 474/80 |
| 2014/0371013 A1 * | 12/2014 | Yamaguchi .......... B62M 9/1244 474/122 |
| 2015/0111675 A1 | 4/2015 | Shipman et al. |
| 2016/0288877 A1 | 6/2016 | Goates et al. |
| 2018/0244345 A1 * | 8/2018 | Yamaguchi .......... B62M 9/1244 |

FOREIGN PATENT DOCUMENTS

| | | |
|---|---|---|
| CN | 204279863 | 4/2015 |
| DE | 202016001048 | 3/2016 |
| WO | 2014158120 | 10/2014 |

* cited by examiner

BICYCLE DERAILLEUR HAVING UPPER AND LOWER ALIGNMENT ASSEMBLIES

CROSS REFERENCE TO RELATED APPLICATIONS

Not Applicable.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

REFERENCE TO A SEQUENCE LISTING, A TABLE, OR A COMPUTER PROGRAM LISTING APPENDIX

Not Applicable.

STATEMENT REGARDING PRIOR DISCLOSURES BY THE INVENTOR OR A JOINT INVENTOR

Not Applicable.

BACKGROUND OF THE INVENTION

This invention relates generally to a rear derailleur for a bicycle, and more particularly a rear bicycle derailleur having upper and lower alignment assemblies.

SUMMARY OF THE INVENTION

In general, the invention relates to a rear derailleur for a bicycle having an upper alignment assembly pivotally attached to the bicycle via along a b-knuckle mounting axis. The upper alignment assembly is configured to pivot about an upper rotatable axis that is generally perpendicular to the b-knuckle mounting axis. The rear derailleur also has a lower alignment assembly pivotally connected to the upper alignment assembly via a linkage assembly. The lower alignment assembly is pivotally connected to a pulley assembly along a p-knuckle mounting axis. The lower alignment assembly is configured to pivot about a lower rotatable axis that is generally perpendicular to the p-knuckle mounting axis.

The upper rotatable axis may be substantially perpendicular to the b-knuckle mounting axis along a horizontal plane, and the lower rotatable axis may be substantially perpendicular to the p-knuckle mounting axis along a vertical plane. As such, the lower rotatable axis can be generally perpendicular with the upper rotatable axis, and the b-knuckle mounting axis can substantially parallel with the p-knuckle mounting axis.

The upper alignment assembly can also include a motor assembly and a transmission assembly configured to pivot the upper alignment assembly along said upper rotatable axis that is generally perpendicular to the b-knuckle mounting axis. The motor assembly drives the transmission assembly in a clockwise direction to move the rear derailleur in an inboard direction or in a counter-clockwise direction to move the rear derailleur in an outboard direction. The upper alignment assembly may be constructed from a knuckle housing coupled to a generally tubular housing having opposing generally planar axial or open ends. The tubular housing is removably connected to the bicycle using a main bolt, and the tubular housing and the main bolt are concentrically aligned with the main bolt forming the b-knuckle mounting axis.

The lower alignment assembly can also include a motor assembly and a transmission assembly configured to pivot the lower alignment assembly about the lower rotatable axis that is generally perpendicular to the p-knuckle mounting axis. The lower alignment assembly can be constructed from a stationary knuckle housing engaged with a pivot knuckle housing. The lower alignment assembly may have a pivot gear plate pivotally seated between the stationary knuckle housing and the pivot knuckle housing. The motor assembly drives the transmission assembly about an intermediate rotatable axis that translates to rotational motion of the pivot gear plate and the pivot knuckle housing about the lower rotatable axis. The intermediate rotatable axis is substantially perpendicular to the p-knuckle mounting axis along a horizontal plane, and is substantially perpendicular to the lower rotatable axis along a vertical plane. The lower alignment assembly pivots in a clockwise direction to pivot the pully cage in a clockwise direction, and pivots in a counter-clockwise direction to pivot the pulley cage in a counter-clockwise direction.

In addition, the rear derailleur may include a plurality of sensors configured to detect and regulate realignment of the rear derailleur. The sensors may include an array of upper sensors configured to detect and maintain alignment of the rear derailleur along an inboard reference plane, and an array of lower sensors configured to maintain alignment of the rear derailleur along an outboard reference plane. The upper sensors may be proximity sensors configured to be attached to or embedded within an inboardmost cog of a bicycle cassette, and the lower sensors may be proximity sensors configured to be attached to or embedded within the lower alignment assembly.

DETAILED DESCRIPTION OF THE INVENTION

Figure 1:
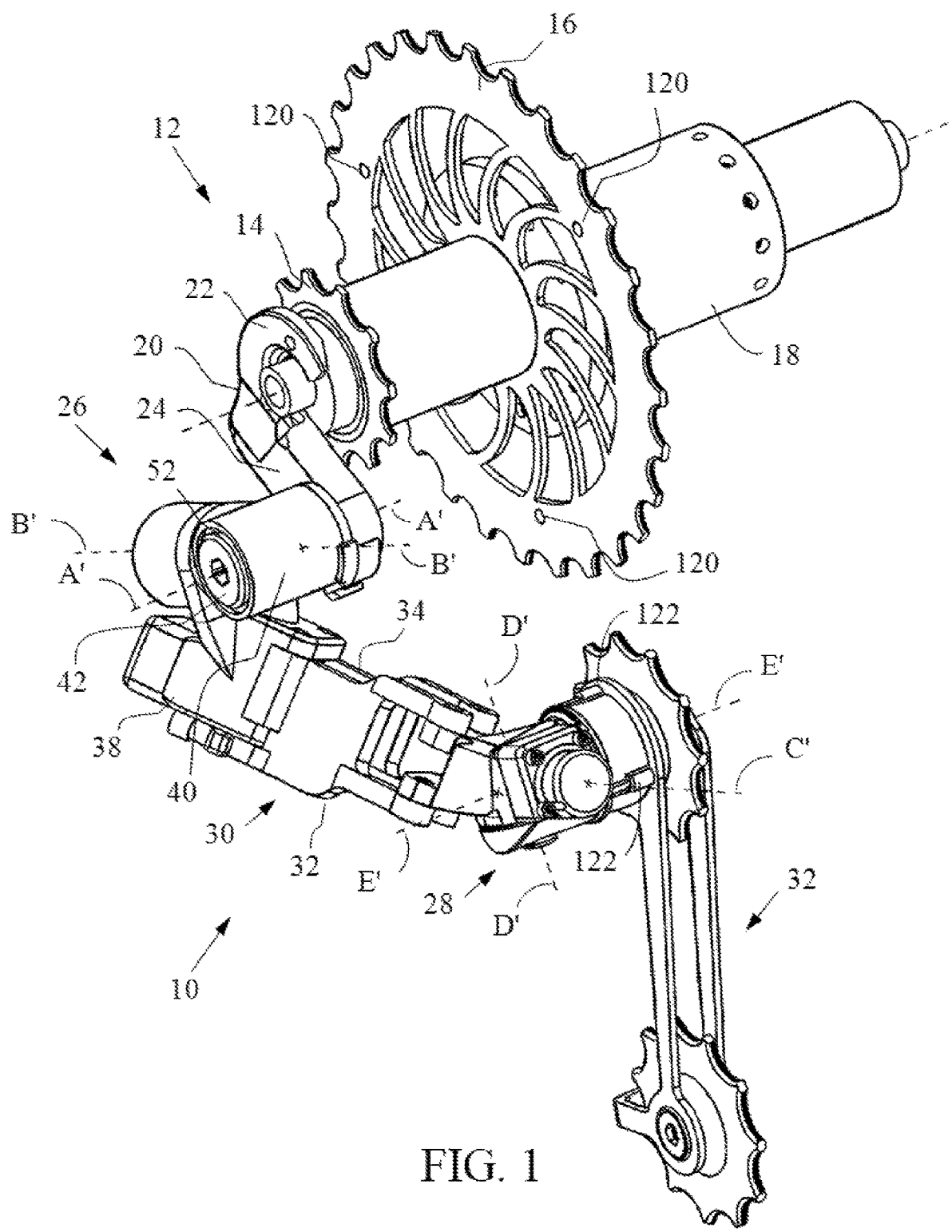
FIG. 1 is an outboard perspective view of an example of a rear derailleur in accordance with an illustrative embodiment of the invention disclosed herein.
Figure 2:
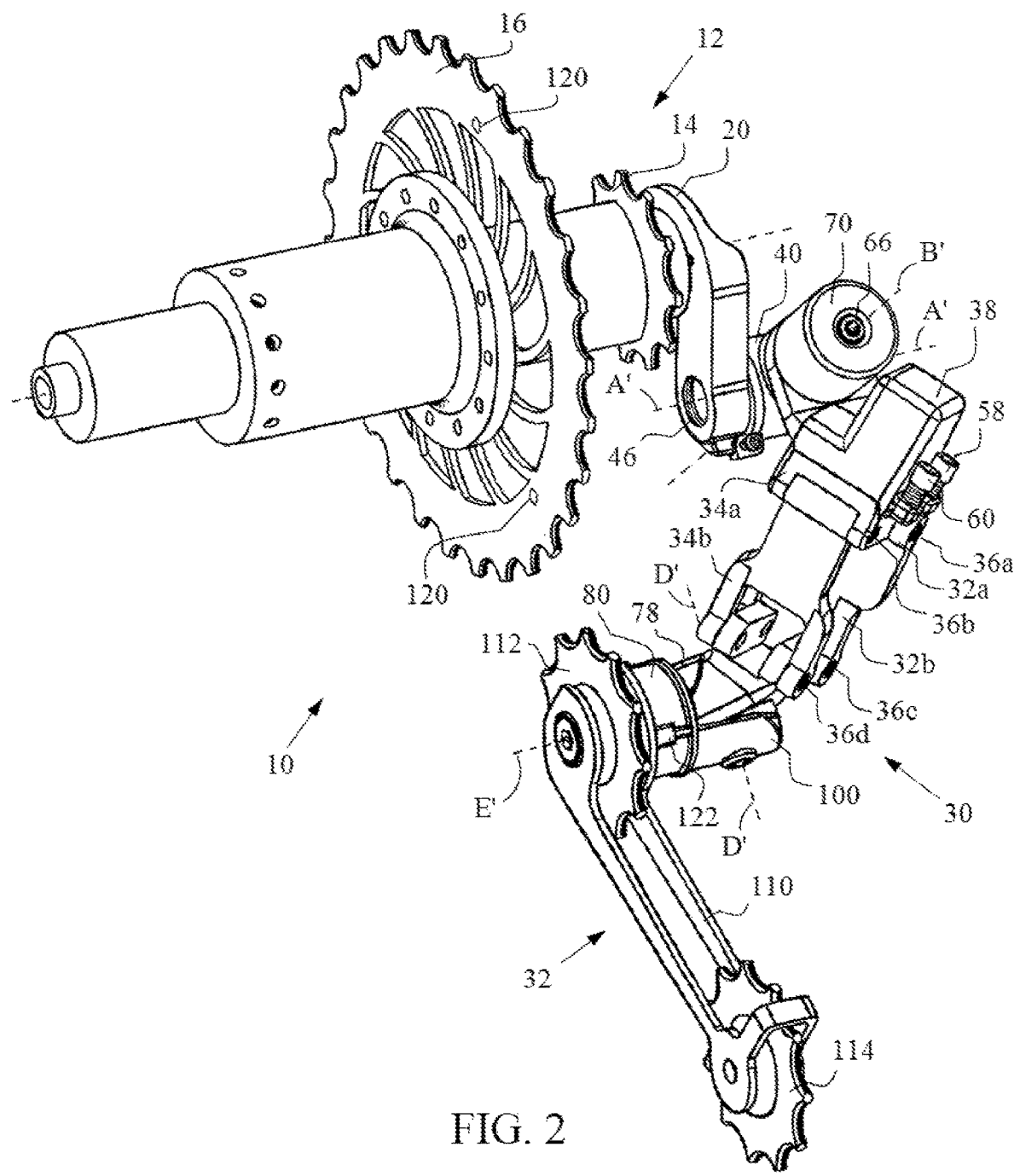
FIG. 2 is an inboard perspective of an example of a rear derailleur in accordance with an illustrative embodiment of the invention disclosed herein.
Figure 3:
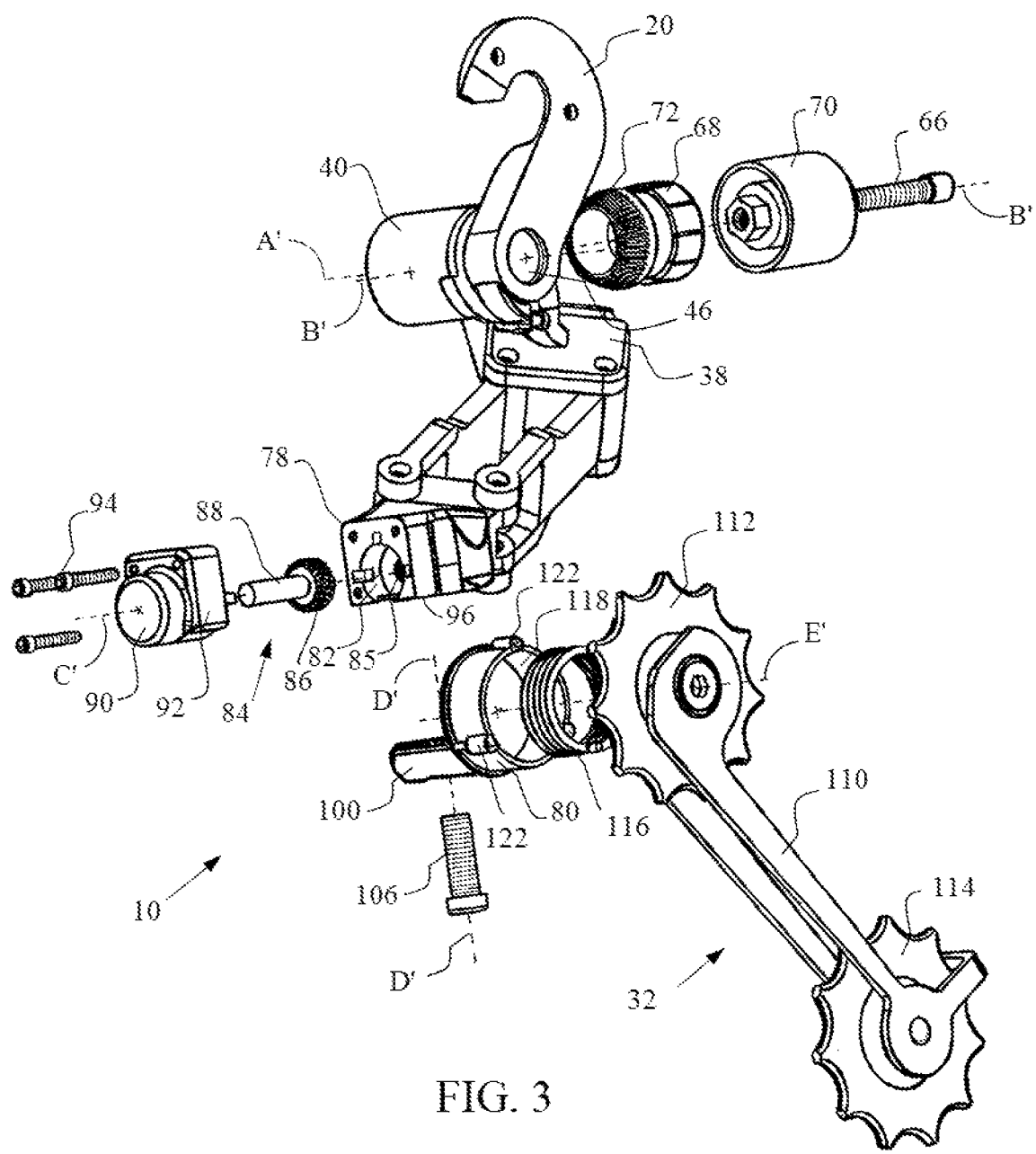
FIG. 3 is a partially exploded view of the rear derailleur shown in FIG. 1.
Figure 4:
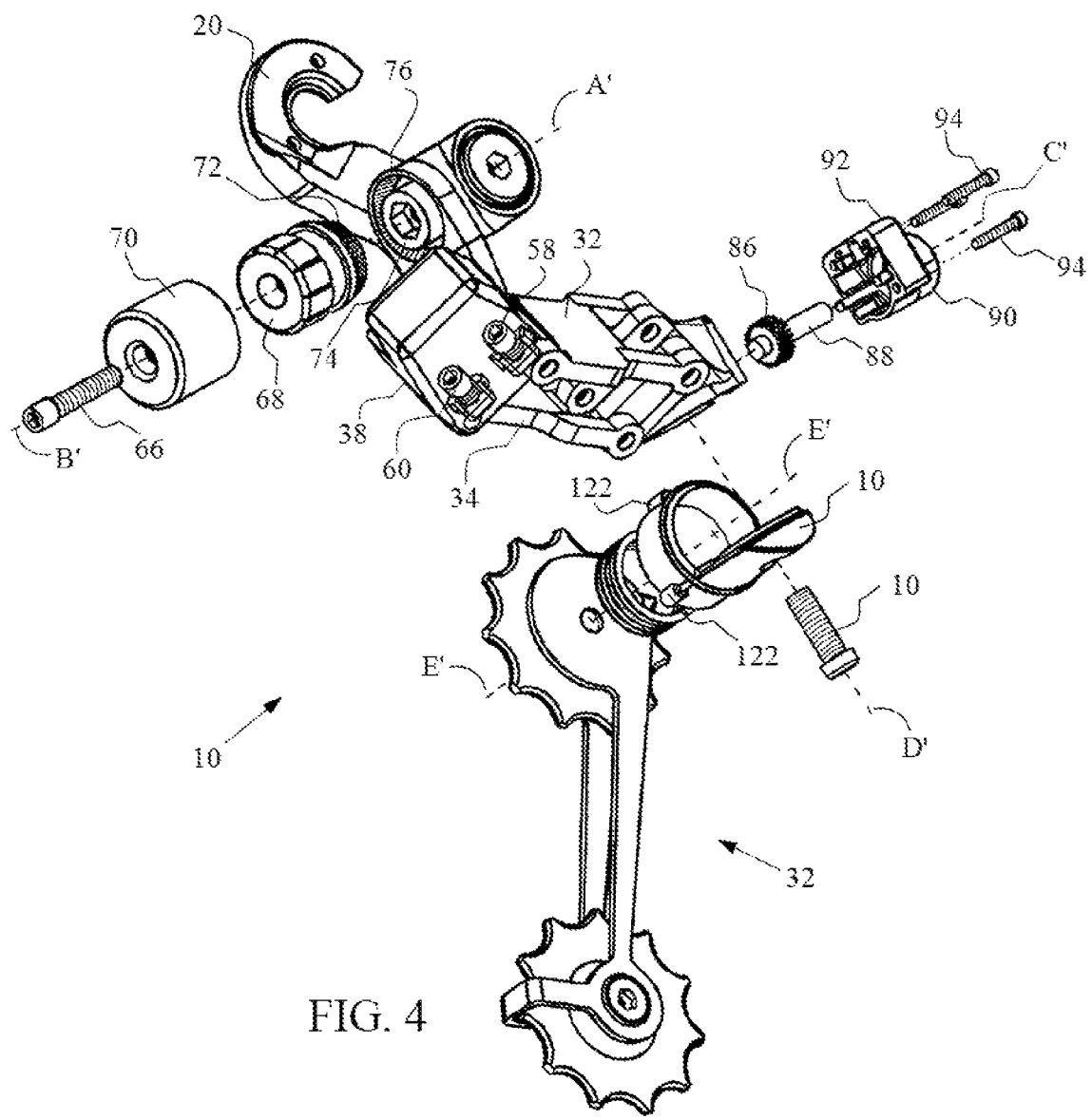
FIG. 4 is a partially exploded view of the rear derailleur shown in FIG. 2.
Figure 5:
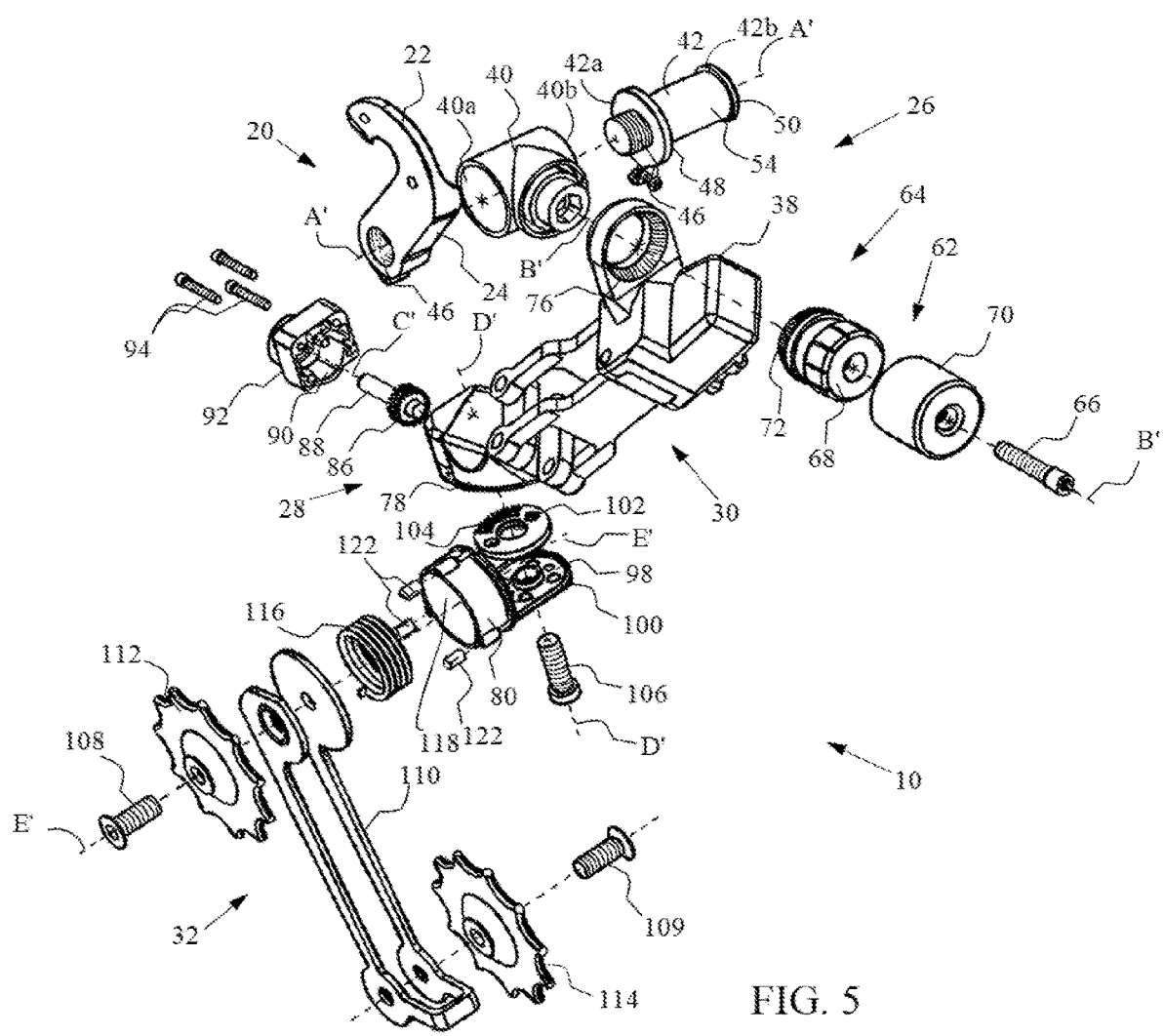
FIG. 5 is an exploded view of an example of a rear derailleur in accordance with an illustrative embodiment of the invention disclosed herein.

The embodiments discussed herein are merely illustrative of specific manners in which to make and use this invention and are not to be interpreted as limiting in scope.

While the invention has been described with a certain degree of particularity, it is to be noted that many modifications may be made in the construction and the arrangement of its components without departing from the scope of the invention. It is understood that the invention is not limited to the embodiments set forth herein for purposes of exemplification.

The description of the invention is intended to be read in connection with the accompanying drawings, which are to be considered part of the entire written description of this invention. In the description, relative terms such as "front," "rear," "lower," "upper," "horizontal," "vertical," "above," "below," "up," "down," "top," "bottom," "left," and "right" as well as derivatives thereof (e.g., "horizontally," "downwardly," "upwardly" etc.) are used for the sake of clarity and not as terms of limitation, and should be construed to refer to the orientation as then described or as shown in the drawings under discussion. These relative terms are for convenience of description and do not require that the machine be constructed or the method to be operated in a particular orientation. Terms, such as "connected," "connecting," "attached," "attaching," "join" and "joining" are used interchangeably and refer to one structure or surface being secured to another structure or surface or integrally fabricated in one piece. Moreover, the terms refer to bicycle mechanisms conventionally mounted to a bicycle and with the bicycle oriented and used in a standard fashion unless otherwise indicated.

Referring to the figures of the drawings, wherein like numerals of reference designate like elements throughout the several views, a rear derailleur 10 is configured to be coupled to a frame (not shown) of a bicycle (not shown). The rear derailleur 10 controls the position of a bicycle chain (not shown) on a rear cassette or freewheel 12 in response to a shift command by a rider for controlling a gear change towards a higher or a lower gear ratio. Electronic derailleurs change gears on the bicycle using electronic switches and motors instead of using conventional control levers and cables. The switches are connected by wire or wirelessly to a portable power source, such as a battery pack, and to an electric motor that drives the rear derailleur, switching the chain from cog to cog along with cassette 12. The cassette 12 includes a smallest, outboardmost cog 14, a largest, inboardmost cog 16, and a plurality of cogs (not shown) ranged in size and position in between cog 14 and 16. During usage, the rear derailleur 10 laterally moves the chain either inboard (toward the center line of the bicycle) from one cog (i.e., gear) to the next inner cog in order to shift towards a lower gear ratio or outboard (away from the center line of the bicycle) from one cog to the next outer cog of the cassette 12 in order to shift towards a higher gear ratio.

The rear derailleur 10 may be attached to the bicycle in a conventional manner. As illustrated, the rear derailleur 10 may be attached to the bicycle frame (not shown) using a derailleur hanger 20 having an upper curved or bent portion 22 coupled to the bicycle frame (not shown). The upper curved portion 22 of the hanger 20 is articulated to a lower portion 24 that is attached to an upper alignment assembly 26 of the rear derailleur 10. Alternatively, as will be appreciated by a person having ordinary skill in the art, the rear derailleur 10 may be directly rotatably coupled to the cassette 12, and may be biased using a spring member (not shown) coaxially mounted to the cassette 12.

The upper alignment assembly 26, also referred to as a "b-knuckle" or "b-pivot", of the rear derailleur 10 is coupled to a lower alignment assembly 28, also referred to as a "p-knuckle" or "p-pivot", via a linkage assembly 30. A pulley assembly 32 is pivotally coupled to the lower alignment assembly 28. The linkage assembly 30 takes the form of a parallelogram having an outer link plate 32 and an inner link plate 34 that are pivotally coupled at first terminal ends 32a and 34a, respectively, to the upper alignment assembly 26 and pivotally coupled at second terminal ends 32b and 34b, respectively, to the lower alignment assembly 28 using link pins 36a-d, which form a pivot axis. The pivot axis formed by link pins 36a-d are substantially parallel (i.e., within a few degrees) to the planes defined by the planes of the outer link plate 32 and the inner link plate 34 of the linkage assembly 30. A biasing spring or member (not shown) is also coupled between the upper link plate 32 and the lower link plate 34 for urging the linkage assembly 30 in an outboard direction to take the backlash of the linkage assembly 30.

The upper alignment assembly 26 includes a knuckle housing 38 coupled to a generally tubular housing 40 having opposing generally planar axial or open ends 40a and 40b. The tubular housing 40 is removably connected to the derailleur hanger 20 using a main bolt 42. A mounting axis A' may be defined by the axial direction of the main bolt 42 and the tubular housing 40 of the upper alignment assembly 26, or, for example, by the axis of the hanger opening of the bicycle frame dropout (not shown). As illustrated, a first terminal end 42a of the main bolt 42 includes an externally threaded section 44 that attaches to an internally threaded section 46 of the lower portion 24 of the derailleur hanger 20. The first terminal end 42a of the bolt 42 also includes an annular stop shoulder 48 that engages an outer periphery of one of the open ends 40a of the tubular housing 40. A second terminal end 42b of the bolt 42 also includes an annular stop shoulder 50 that engages an outer periphery of the other open end 40b of the tubular housing 40. The tubular housing 40 includes an inwardly extending annular flange 52 that engages a cylindrical shank 54 formed intermediate of the annular stop shoulders 48 and 50 of the main bolt 42, and the cylindrical shank 54 is disposed within the tubular housing 40 of the upper alignment assembly 26.

The knuckle housing 38 of the upper alignment assembly 26 is joined to the linkage assembly 30 using link pins 36a-b. As is known in some derailleurs, a high limit bolt 58 and/or a low limit bolt 60 may be disposed in the knuckle housing 38 of the upper alignment assembly 26 and engageable with the linkage assembly 30 to selectively adjust the displacement of the upper alignment assembly 26 relative to the lower alignment assembly 28. By advancing and retracting the low limit bolt 60, the inboard range of motion of the inner link plate 34 can be selectively limited. Similarly, by advancing and retracting the high limit bolt 58, the outboard range of motion of the outer link plate 32 can be selectively limited.

The upper alignment assembly 26 also includes an upper motor assembly 62 and a transmission assembly 64. By way of illustration and not limitation, the motor assembly 62 and the transmission assembly 64 are rotatably coupled to the knuckle housing 38 and attached to the tubular housing 40 of the upper alignment assembly 26 using a bolt 66. In particular, the motor assembly 62 includes a motor 68 disposed within a motor housing 70 that is coaxial therewith, and the motor 68 powered by the power source (not shown) drives the transmission assembly 64. The transmission assembly 64 has an annular gear ring 72 that is engaged with an annular gear 74 within an inner periphery of a circular orifice 76 of the knuckle housing 38. A rotatable axis B' may be defined by the axial direction of the bolt 66, the motor assembly 62 and the transmission assembly 64. The rotatable axis B' is substantially perpendicular (i.e., within a few degrees) to the mounting axis A' along the horizontal or transverse plane. During usage, the motor assembly 62 drives the transmission assembly 64 in a clockwise direction to move the rear derailleur 10 in an inboard direction or in a counter-clockwise direction to move the rear derailleur 10 in an outboard direction.

The lower alignment assembly 28 includes a stationary knuckle housing 78 engaged with a pivot knuckle housing 80. The stationary knuckle housing 78 of the lower alignment assembly 28 is pivotally joined to the linkage assembly 30 using link pins 36c-d. The stationary knuckle housing 78 has a cavity 82 for receipt of a transmission assembly 84, namely a spur gear 86 that is fixed to a shaft 88 of a lower motor 90. A rotatable axis C' may be defined by the axial direction of the motor shaft 88 with the spur gear 86. The motor 90 is housed within a motor housing 92 and attached to the stationary knuckle housing 78 is using housing bolts 94. The cavity 82 of the stationary knuckle housing 78 has a centrally located tubular guide bore 85 for pivotally and slideably receiving an end of the motor shaft 88. The cavity 82 of the stationary knuckle housing 78 opens to an annular gear plate recess 96, and the pivot knuckle housing 80 includes a corresponding annular gear plate recess 98 in an extending tab 100. A pivot gear plate 102 is seated within the annular gear plate recess 98 in the extending tab 100 of the pivot knuckle housing 80, and the spur gear 86 engages a toothed portion 104 of the pivot gear plate 102 via the gear plate recess 96 of the stationary knuckle housing 78. The pivot gear plate 102, the pivot knuckle housing 80 and the stationary knuckle housing 78 are secured together using a knuckle pivot bolt 106, which forms a rotatable axis D' along the axial direction of the knuckle pivot bolt 106. The axis D' is substantially perpendicular (i.e., within a few degrees) to the axis C' along the vertical or sagittal plane. The rotational motion of the spur gear about rotatable axis C' translates to rotational motion of the pivot gear plate and the pivot knuckle housing along rotatable axis D'.

The pivot knuckle housing 80 of the lower alignment assembly 28 is pivotally affixed to the pulley assembly 32 using a pulley bolt 108. The axial direction of the pulley bolt 108 defines a rotatable E' axis that is substantially perpendicular to the rotatable axis D' along the vertical or frontal plane, is substantially perpendicular to the axis C' along the horizontal or traverse plane, and is substantially parallel to the axis A' along the vertical or frontal plane. The pulley assembly 32 includes a pulley cage 110 having an upper guide pulley 112 and a lower tension pulley 114 rotatably coupled thereto. The guide pulley 112 and the tension pulley 114 engage the bicycle chain in an inverse S-like manner, thereby guiding the bicycle chain onto the selected cog of the cassette 12. A cage spring or biasing member 116 is housed within an annular spring recess 118 of the pivot knuckle housing 80, and is disposed around the pulley bolt 108. One leg of the biasing spring 116 engages the pulley cage 110, and the other leg of the biasing spring 116 engages the pivot knuckle housing 80. The action of the biasing spring 116 urges the pulley assembly 32 in a rearward direction to maintain tension on the bicycle chain.

One or more power sources power the motors of the upper alignment assembly 26 and the lower alignment assembly 28, and the transmission assemblies 64 and 84 are respectively coupled to and actuated by the motors 68 and 90 to respectively move the upper alignment assembly 26 and the lower alignment assembly 28. The motors 68 and 90 may be an electric servo motor or the like that provides for a rotation of about 40 degrees.

The rear derailleur 10 having upper alignment and lower alignment assemblies 26 and 28 maintains alignment and helps insure ideal shifting performance and drive train operation though an optimized chain-feed-path. The rear derailleur 10 disclosed herein also minimizes potential damage to the chain, derailleur, cassette, bicycle frame, wheel and/or rider by obviating the misalignment of the rear derailleur 10 due to impact damage, an improperly manufactured rear derailleur hanger, a misaligned rear derailleur hanger and/or an improperly installed rear wheel. While conventional rear derailleurs have axis of rotation about the mounting bolt A' for anterior and posterior movement of the rear derailleur and about the pivot axis E' for anterior and posterior movement of the pulley cage, the rear derailleur 10 disclosed herein also has axis of rotation about the pivot axis B' for lateral movement of the upper alignment assembly 26 and about the pivot axis D' for bilateral movement of the lower alignment assembly 28.

The power source(s) also powers a plurality of sensors for comparative planar alignment analysis to allow for controlled realignment of the lower alignment assembly 28 and the upper alignment assembly 26. An array of upper sensors 120 can be attached to or embedded with the inboardmost cog 16 of the cassette 12 to form an inboard reference plane. Additionally, an array of lower sensors 122 can be attached to or embedded within the knuckle pivot housing 80 of the lower alignment assembly 28. The lower sensors 122 form an outboard reference plane, and detect and maintain alignment of the rear derailleur 10 in relation to the inboard reference plane. The sensors 120 and 122 enable the upper alignment assembly 26 and the lower alignment assembly 28 to self-regulate the realignment of the rear derailleur 10.

The sensors 120 and 122 can be proximity sensors (e.g., optical, capacitive, inductive, magnetic or the like) that are electronically connected to a control module (not shown). The control module is also electronically connected to the motor 68 of the upper alignment assembly 26 and the motor 90 of the lower alignment assembly 28. The control module includes electronics configured to perform comparative planar alignment analysis using the upper sensors 120 and the lower sensors 122. During usage, the control module establishes the inboard reference plane using the upper sensors 120 and maintains the outboard reference plane in a parallel relation to the inboard reference plane established by the lower sensors 122 using periodic call-response signals from the plurality of sensors. The control module is configured to electronically perform a topographical algorithm that compares the respective positions of the upper sensors 120 and the lower sensors 122, and in response, adjusts the orientation of the upper alignment assembly 26 and/or the lower alignment assembly 28 to maintain parallel orientation of the pulley assembly 32 in relation to the inboard reference plane.

Figure 6:
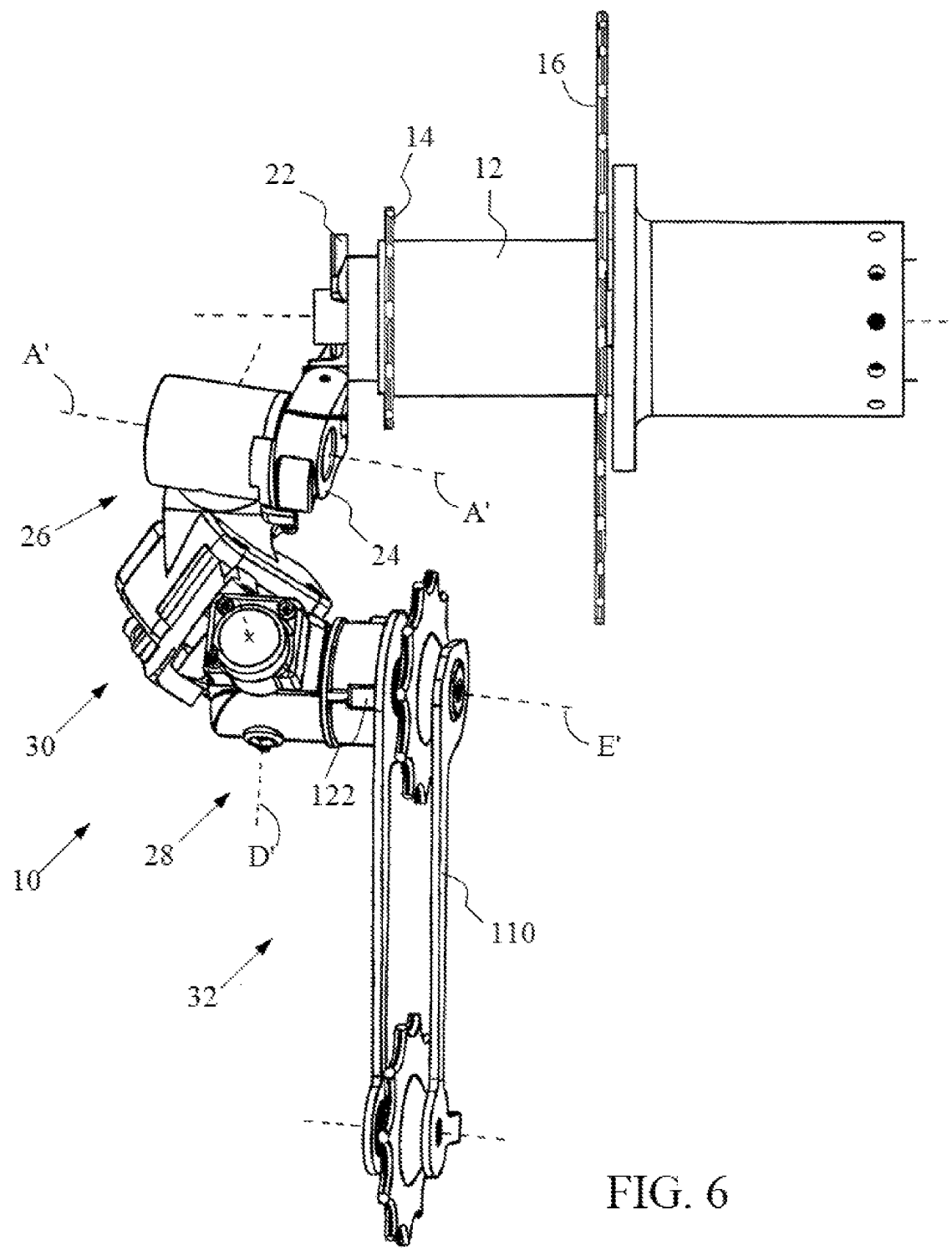
FIG. 6 is a rear elevation view of an example of a rear derailleur having a −15-degree misaligned pully assembly in accordance with an illustrative embodiment of the invention disclosed herein.
Figure 7:
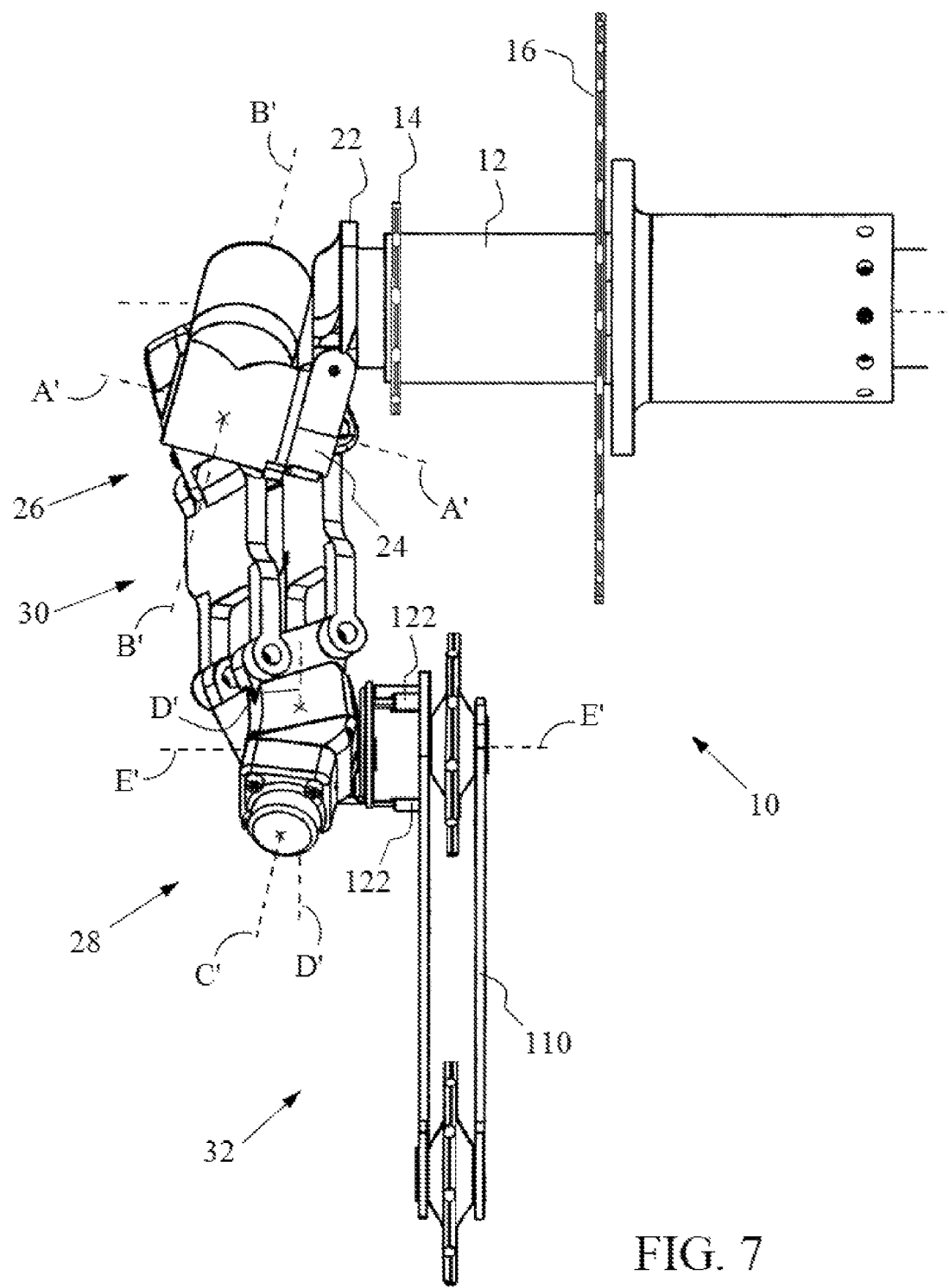
FIG. 7 is a rear elevation view of the rear derailleur shown in FIG. 7 in proper alignment.
Figure 8:
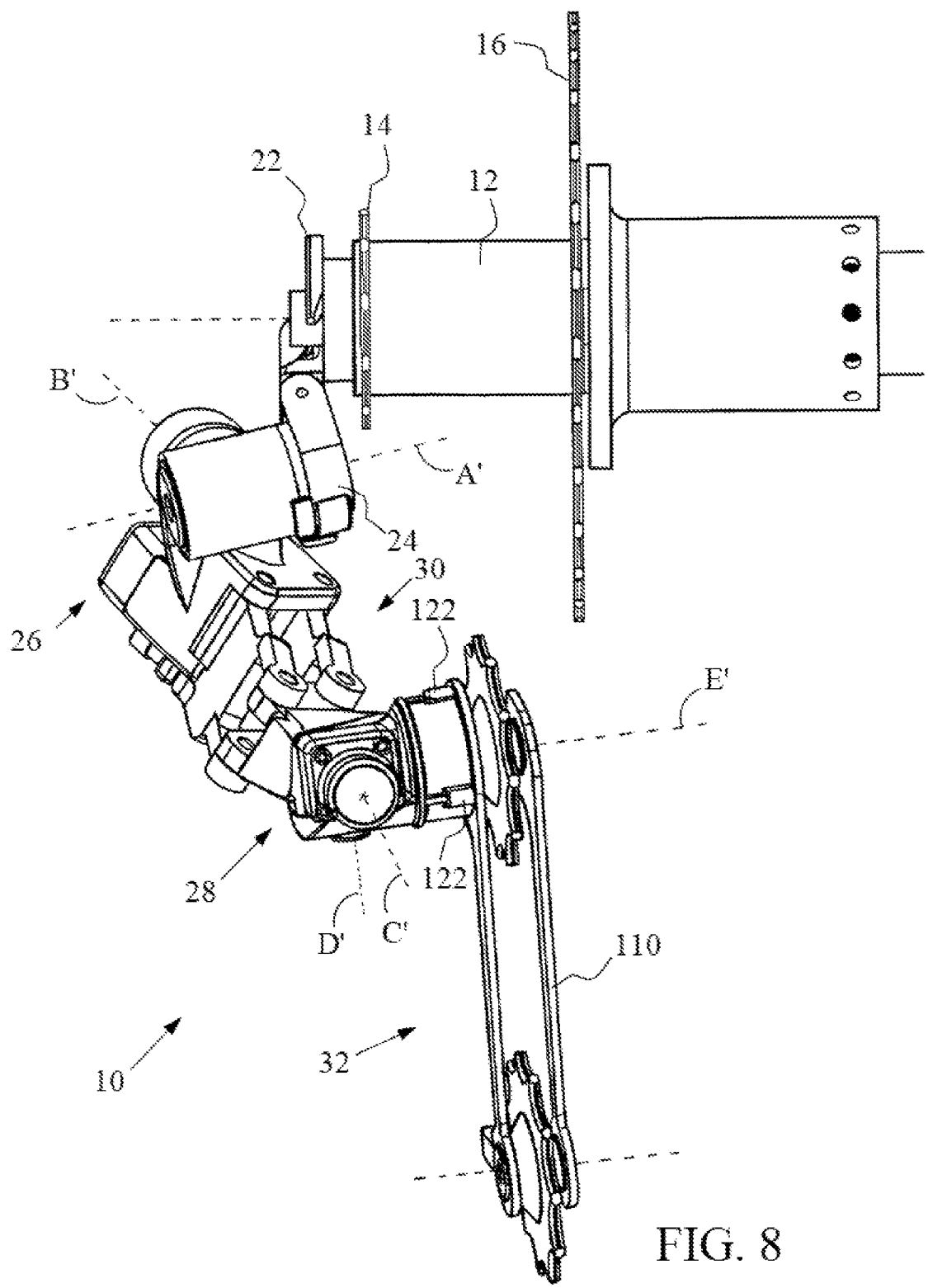
FIG. 8 is a rear elevation view of an example of a rear derailleur having a +15-degree misaligned pully assembly in accordance with an illustrative embodiment of the invention disclosed herein.
Figure 9:
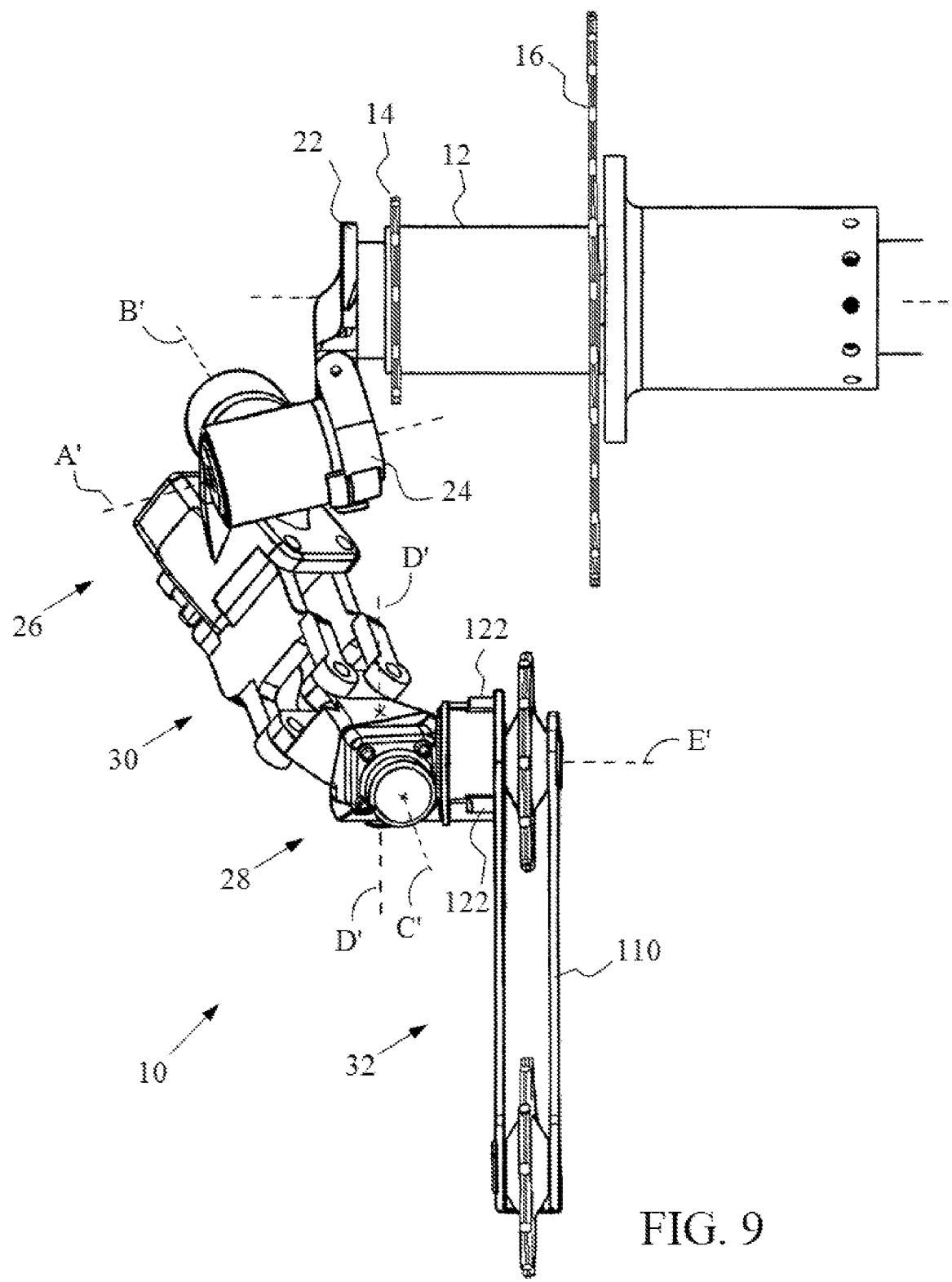
FIG. 9 is a rear elevation view of the rear derailleur shown in FIG. 8 in proper alignment.

Turning now to FIGS. 6 through 9, the rear derailleur is illustrated in FIG. 6 as having a −15-degree misalignment in the pully assembly. The control module performs the topographical alignment analysis by detecting the planar angle of the outboard reference plane using the lower sensors 122, and then comparing the outboard reference plane to the inboard reference plane as established by the upper sensors 120 in the inboardmost cog 16. The control module then instructs the upper motor assembly 68 and/or the lower motor assembly 90 to move the upper alignment assembly 26 and/or the lower alignment assembly 28 to realign the pulley assembly 32 to be parallel with a particular cog of the cassette 12. Similarly, the rear derailleur 10 is illustrated in FIG. 8 as having a +15-degree misalignment in the pully assembly 32. In response to the topographical alignment analysis, the control module instructs the upper motor assembly 68 and/or the lower motor assembly 90 to move the upper alignment assembly 26 and/or the lower alignment assembly 28 to realign the pulley assembly 32 to be parallel with the particular cog of the cassette 12.

Whereas, the embodiments have been described in relation to the drawings, it should be understood that other and further modifications, apart from those shown or suggested herein, may be made within the scope of this invention.

What is claimed is:

1. A rear derailleur for a bicycle, said rear derailleur comprising:
    an upper alignment assembly comprising a b-knuckle assembly pivotally attached to said bicycle via along a b-knuckle mounting axis; said upper alignment assembly further comprising a powered upper transmission assembly configured to pivot about an upper rotatable axis that is generally perpendicular to said b-knuckle mounting axis; and
    a lower alignment assembly comprising a p-knuckle assembly pivotally connected to said upper alignment assembly via a linkage assembly; said lower alignment assembly pivotally connected to a pulley assembly along a p-knuckle mounting axis; said lower alignment assembly further comprising a powered lower transmission assembly configured to pivot about a lower rotatable axis that is generally perpendicular to said p-knuckle mounting axis;
    wherein said powered upper transmission assembly and said powered lower transmission assembly are configured to maintain a generally parallel relationship of said b-knuckle mounting axis and said p-knuckle mounting axis.

2. The rear derailleur of claim 1 wherein said upper rotatable axis is substantially perpendicular to said b-knuckle mounting axis along a horizontal plane.

3. The rear derailleur of claim 2 wherein said lower rotatable axis is substantially perpendicular to said p-knuckle mounting axis along a vertical plane.

4. The rear derailleur of claim 3 wherein said lower rotatable axis is generally perpendicular with said upper rotatable axis, and wherein said b-knuckle mounting axis is substantially parallel with said p-knuckle mounting axis.

5. The rear derailleur of claim 4 wherein said upper alignment assembly further comprises an upper motor assembly and said powered upper transmission assembly configured to pivot the upper alignment assembly along said upper rotatable axis that is generally perpendicular to the b-knuckle mounting axis.

6. The rear derailleur of claim 5 wherein said upper motor assembly drives said powered upper transmission assembly in a clockwise direction to move said rear derailleur in an inboard direction or in a counter-clockwise direction to move said rear derailleur in an outboard direction.

7. The rear derailleur of claim 6 wherein said upper alignment assembly further comprises said b-knuckle housing coupled to a generally tubular housing having opposing generally planar axial or open ends.

8. The rear derailleur of claim 7 wherein said tubular housing is removably connected to said bicycle using a main bolt; wherein said tubular housing and said main bolt are concentrically aligned with said main bolt forming said b-knuckle mounting axis.

9. The rear derailleur of claim 4 wherein said lower alignment assembly further comprises a lower motor assembly and said powered lower transmission assembly configured to pivot said lower alignment assembly about said lower rotatable axis that is generally perpendicular to said p-knuckle mounting axis.

10. The rear derailleur of claim 9 wherein said p-knuckle assembly further comprises a stationary knuckle housing engaged with a pivot knuckle housing.

11. The rear derailleur of claim 10 wherein said lower alignment assembly further comprises a pivot gear plate pivotally seated between said stationary knuckle housing and said pivot knuckle housing.

12. The rear derailleur of claim 11 wherein said lower motor assembly drives said powered lower transmission assembly about an intermediate rotatable axis that translates to rotational motion of said pivot gear plate and said pivot knuckle housing about said lower rotatable axis.

13. The rear derailleur of claim 12 wherein said intermediate rotatable axis is substantially perpendicular to said p-knuckle mounting axis along a horizontal plane, and wherein said intermediate rotatable axis is substantially perpendicular to said lower rotatable axis along a vertical plane.

14. The rear derailleur of claim 13 wherein said lower alignment assembly pivots in a clockwise direction to pivot said pully cage in a clockwise direction, and wherein said lower alignment assembly pivots in a counter-clockwise direction to pivot said pulley cage in a counter-clockwise direction.

15. The rear derailleur of claim 1 further comprising a plurality of sensors configured to detect and regulate realignment of said rear derailleur.

16. The rear derailleur of claim 15 wherein said sensors further comprise an array of upper sensors configured to detect and maintain alignment of said rear derailleur along an inboard reference plane.

17. The rear derailleur of claim 16 wherein said array of upper sensors are proximity sensors configured to be attached to or embedded within an inboardmost cog of a bicycle cassette.

18. The rear derailleur of claim 15 wherein said sensors further comprise an array of lower sensors configured to maintain alignment of said rear derailleur along an outboard reference plane.

19. The rear derailleur of claim 18 wherein said array of lower sensors are proximity sensors configured to be attached to or embedded within said lower alignment assembly.

20. A rear derailleur for a bicycle, said rear derailleur comprising an upper alignment assembly pivotally attached to said bicycle via along a b-knuckle mounting axis, said rear derailleur comprising a lower alignment assembly pivotally connected to said upper alignment assembly via a linkage assembly, said lower alignment assembly pivotally connected to a pulley assembly along a p-knuckle mounting axis, said rear derailleur further comprising:

an upper motor assembly configured to pivot said upper alignment assembly about a first rotatable axis that is generally perpendicular to said b-knuckle mounting axis; and a lower motor assembly configured to pivot said lower alignment assembly about a second rotatable axis that is generally perpendicular to said p-knuckle mounting axis;

wherein said upper motor assembly and said lower motor assembly are configured to maintain a generally parallel relationship of said b-knuckle mounting axis and said p-knuckle mounting axis.

21. The rear derailleur of claim 20 wherein said lower alignment assembly further comprises a third rotatable axis.

22. The rear derailleur of claim 21 wherein said third rotatable axis is generally perpendicular to both said p-knuckle mounting axis and said b-knuckle mounting axis along a horizontal plane, and wherein said third rotatable axis is generally parallel to said upper rotatable axis.

23. The rear derailleur of claim 20 further comprising a plurality of sensors configured to detect and regulate realignment of said rear derailleur.

24. The rear derailleur of claim 23 wherein said sensors further comprise an array of upper sensors configured to detect and maintain alignment of said rear derailleur along an inboard reference plane, an array of lower sensors configured to maintain alignment of said rear derailleur along an outboard reference plane, or both.

25. The rear derailleur of claim 24 wherein said array of upper sensors are proximity sensors configured to be attached to or embedded within an inboardmost cog of a bicycle cassette, and wherein said array of lower sensors are proximity sensors configured to be attached to or embedded within said lower alignment assembly.

* * * * *